UNITED STATES PATENT OFFICE.

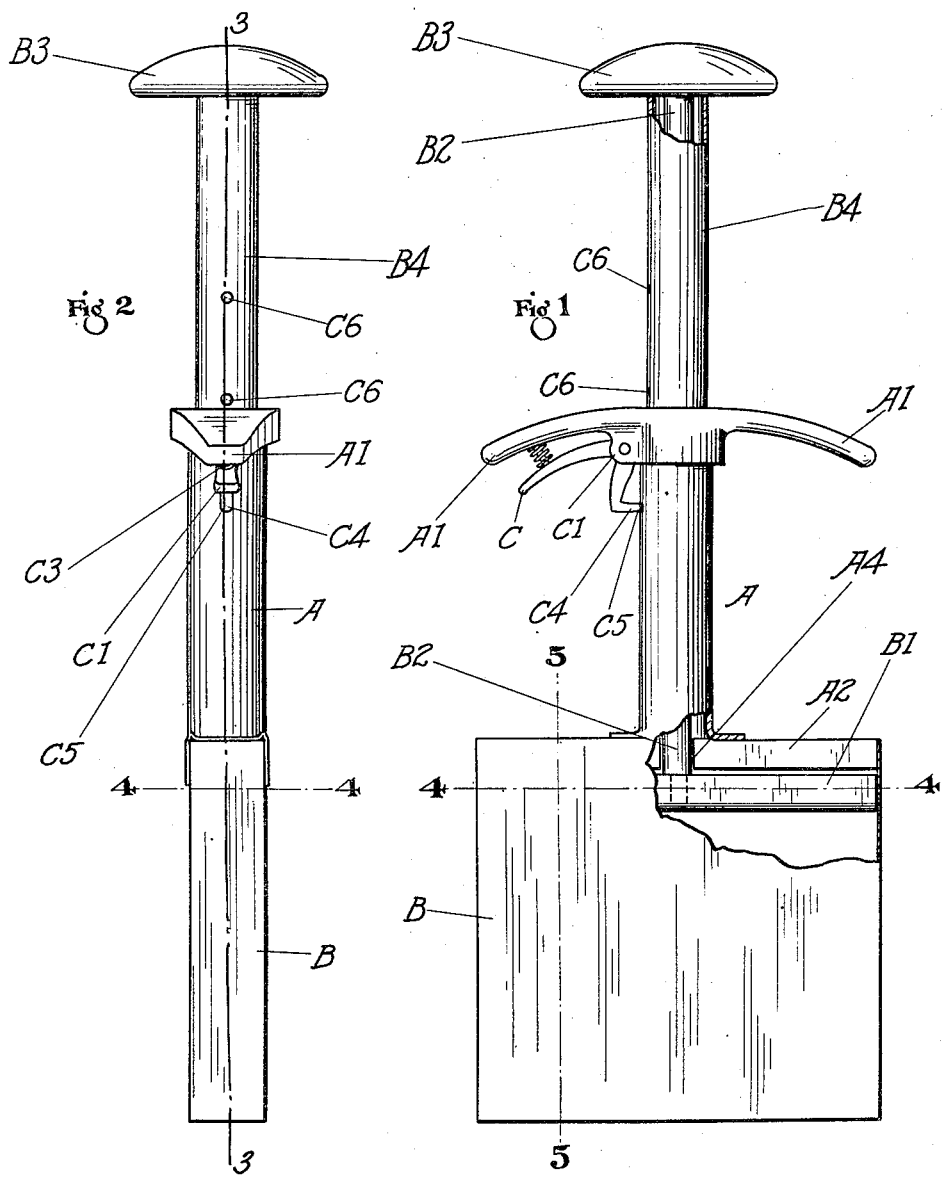

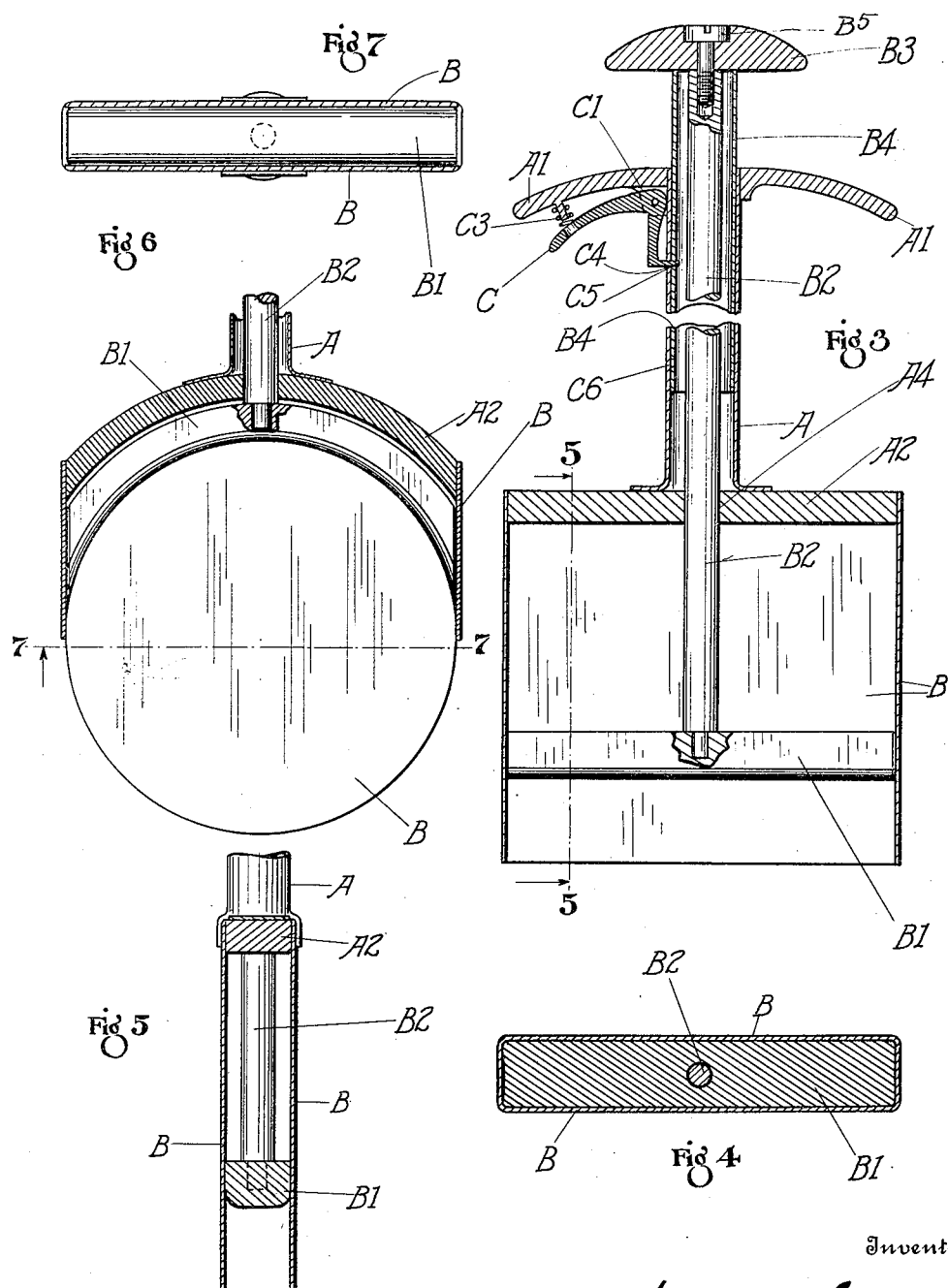

SAMUEL LEVY, OF KNOXVILLE, TENNESSEE.

ICE-CREAM DIPPER.

1,352,755.   Specification of Letters Patent.   Patented Sept. 14, 1920.

Application filed June 30, 1919. Serial No. 307,846.

*To all whom it may concern:*

Be it known that I, SAMUEL LEVY, a citizen of the United States, residing at Knoxville, in the county of Knox and State of Tennessee, have invented a new and useful Improvement in Ice-Cream Dippers, of which the following is a specification, reference being had to the accompanying drawing.

My improvement relates particularly to hand tools adapted to take from a mass of ice cream a body of ice cream in form to be used for the filling of an ice cream sandwich. The object of the invention is to provide such a mechanism in simple and convenient form. A further object of the invention is to provide such a dipper so constructed as to permit the easy forming of a layer or cake composed of a plurality of kinds of ice cream.

In the accompanying drawings,

Figure 1 is a side elevation of a mechanism embodying my improvement, portions being broken away;

Fig. 2 is an elevation looking at Fig. 1 from the left;

Fig. 3 is a section on the line, 3—3, of Fig. 2;

Fig. 4 is a section on the line, 4—4, of Figs. 1 and 2;

Fig. 5 is a section on the line, 5—5, of Fig. 1;

Fig. 6 shows a modification;

Fig. 7 is a section on the line, 7—7, of Fig. 6.

Referring to said drawings, A is a tubular stem or handle on one end of which is a cross-head, $A^1$. On the other end of said handle is a transverse head, $A^2$, to which is attached the upper edge of the hollow dipper body, B. Said body is shown in transverse cross section in Fig. 4. In one direction the transverse cross section of said body is much reduced relative to the corresponding dimension in the other direction. In other words, said cross section is elongated. Thus the dipper is adapted to receive a quantity of ice cream which will form a flat sheet or cake which is of rectangular form. Within the body, B, is a plunger, $B^1$, which loosely fills the cross section of the body, B, and is attached to the stem, $B^2$, which extends along the axial line of the handle, A, and has its outer end attached to a cross head, $B^3$, by the screw $B^5$. Within the handle, A, is a guide tube, $B^4$, the outer end of which is secured to the cross head, $B^3$. Said guide tube telescopes into the handle, A, and is of proper length to bear against the upper face of the head, $A^2$, when the stem, $B^2$, has been moved downward far enough to bring the plunger, $B^1$, into the mouth of the body, B. The guide tube is to be regarded as a part of the plunger stem. The lower edge of the plunger, $B^1$, is made round or convex transversely, in order that the cake of ice cream being expelled from the body, B, will have a minimum adhesion to the plunger, practical tests having shown that this feature is desirable. Below the cross-head, $A^1$, is an angle lever, C, which is pivoted on a horizontal axis between ears, $C^1$, formed on the handle, A. Said lever has a horizontal arm which is approximately parallel to the adjacent cross-head, $A^1$. An expanding coiled spring, $C^3$, is seated between said cross-head and said arm and tends to press said arm downward, whereby the other arm of the angle lever is pressed yieldingly toward the handle, A. The lower end of said arm bears a finger, $C^4$, which is adapted to enter an aperture, $C^5$, in the wall of the handle, A. The guide tube, $B^4$, has apertures, $C^6$, which are adapted to register successively with the aperture, $C^5$, when the tube, $B^4$, is moved endwise. When one of the apertures, $C^6$, registers with the aperture, $C^5$, the finger, $C^4$, extends through the aperture, $C^5$, and into the adjacent aperture, $C^6$. When that has occurred, the tube, $B^4$, is locked against further movement in either direction until the horizontal arm of the lever, C, is pressed upward and said lever rocked sufficiently to withdraw the end of the finger, $C^4$, from the adjacent aperture, $C^6$. By this means the plunger can be secured in different positions when that is desired.

When a sheet or cake of ice cream is to be formed of the largest size to which the implement is adapted, the body, B, and the handle, A, are allowed to move downward on the guide tube, $B^4$, until the finger, $C^4$, has entered the lower-most aperture, $C^5$, of the guide tube. Then the plunger, $B^1$, is in its highest position. For producing such downward movement of the body, B, and the handle, A, the angle lever, C, is tilted to cause the withdrawal of the finger, $C^4$, out of the range of the tubular guide, $B^4$. When that has been done, the body, B, and the handle, A, will move downward by gravity, the tube, B⁴, being sufficiently loose in the handle, A, and the stem, B², being sufficiently loose in the bearing, A⁴, and the plunger, B¹, being sufficiently loose in the body, B, to permit such movement by gravity. Manifestly this feature is a matter of convenience. These parts, or a portion of them may fit sufficiently close to require positive downward movement of the body, B, and the handle, A.

When the plunger is thus set in its highest position, the implement is pressed downward into a mass of ice cream until the body, B, has been filled with the ice cream. Then the implement is lifted to any object which is to receive the sheet or cake of ice cream which is now within the body, B. That object may be a wafer which is to be one of the wafers of an ice cream sandwich, or said object may be a plate or saucer. Then the plunger is pressed downward by pressing the cross-head, B³, downward, so that the stem, B², and the guide tube, B⁴, will move downward within the handle, A. In this manner the cake of ice cream is deposited flatwise upon the wafer or plate or saucer. When so desired, several such cakes of ice cream may be formed successively and laid upon each other. In that case, each cake may be taken from a different mass of ice cream.

The same cake may be formed of different kinds of ice cream by first setting the plunger, B¹, in the position determined by engaging the angle lever, C, in the lowest aperture, C⁶, and then driving the body of the implement into one kind of ice cream until said body is filled upward against the plunger, and then raising the plunger until the angle lever locks in the next notch, and then driving the implement into another mass of ice cream until the two charges of ice cream thus taken fill the space below the plunger, and then again raising the plunger and locking the angle lever in the third position, and then driving the implement into a third mass of ice cream until the interior of the body, B, is filled from the mouth of said body upward to and against the plunger. Then the cake will consist of three bars of ice cream, each bar consisting of a distinct kind of ice cream and meeting and adhering to the edge of the adjoining bar. This cake is to be expelled by depressing the plunger. The side faces of the cake thus formed will be rectangular.

A cake having approximately circular sides may be formed by forming the lower edges of the side walls of the body semi-circular and curving the plunger, B¹, in the reverse direction. (See Figs. 6 and 7).

As above intimated, the several parts of the plunger are preferably so loose in the body, B, and the handle, A, and said body and said handle made of such weight as that said body and handle will readily descend to their lower limit when the empty mechanism is held by the plunger cross-head. Such downward movement is to be limited by engagement between the plunger head and the transverse head, A². One of the apertures in the guide tube is to register with the aperture in the handle when the downward limit of the handle and body has been reached, in order that the angle lever may then engage the guide tube of the plunger stem.

Without disturbing other parts, the plunger, B¹, and the stem, B², may be removed for cleansing after releasing the screw, B⁵. To enhance cleanliness, the stem is entirely closed, the apertures for receiving the finger, C⁴, being in the guide tube, B⁴.

I claim as my invention,

1. In a mechanism of the nature described, the combination of a handle and a hollow, flattened body rigid with and extending in the same direction as the handle, a plunger head located transversely within said body and having its lower edge rounded transversely to its length, and a stem attached to said plunger and guided by said handle, substantially as described.

2. In a mechanism of the nature described, the combination of a handle and a hollow, flattened body rigid with and extending in the same direction as the handle, a plunger head located transversely within said body and having its lower edge rounded transversely to its length, a stem attached to said plunger and guided by said handle, and means for locking the plunger relative to the handle, substantially as described.

3. In a mechanism of the nature described, the combination of a handle and a hollow, flattened body rigid with and extending in the same direction as the handle, a plunger head located transversely within said body and having its lower edge rounded transversely to its length, a stem attached to said plunger and guided by said handle, and means for locking the plunger relative to the handle, in a plurality of positions, substantially as described.

4. In a mechanism of the nature described, the combination of a hollow body, a tubular handle on said body, a plunger head within said body, a guide tube within said handle, a stem extending from said plunger upward through said handle and guide tube, and a cross-head joined to the guide tube and detachably joined to the stem, substantially as described.

5. In a mechanism of the nature described, the combination of a hollow body, a tubular handle on said body, a plunger head within said body, a guide tube within said handle, a stem extending from said plunger upward through said handle and guide tube, a cross-head detachably joined to the guide tube and the stem, and means for making locking engagement between the handle and the guide tube, substantially as described.

6. In a mechanism of the nature described, the combination of a hollow body, a tubular handle on said body, a plunger head within said body, a guide tube within said handle of proper length to bear on the head of the dipper to limit downward movement of the plunger, a stem extending from said plunger upward through said handle and guide tube, and a cross-head joined to the guide tube and the stem, substantially as described.

7. In a mechanism of the nature described, the combination of a hollow body, a tubular handle on said body, said handle having a lateral aperture, a plunger within said body, a guide tube within said handle and having a lateral aperture, a stem extending from said plunger upward through said handle and guide tube, a cross-head joined to the guide tube and the stem, and a member supported by the handle in position to permit a part thereof to enter the aperture on the handle and also the aperture in the guide tube which at the time registers with the aperture in the handle, substantially as described.

In testimony whereof I have signed my name, this 27th day of June, in the year one thousand nine hundred and nineteen.

SAMUEL LEVY.